(12) United States Patent
Dai

(10) Patent No.: US 8,730,426 B2
(45) Date of Patent: May 20, 2014

(54) LIQUID CRYSTAL DISPLAY DEVICE

(75) Inventor: Shu-Hua Dai, New Taipei (TW)

(73) Assignee: Wistron Corporation, New Taipei (TW)

( * ) Notice: Subject to any disclaimer, the term of this patent is extended or adjusted under 35 U.S.C. 154(b) by 151 days.

(21) Appl. No.: 13/416,444

(22) Filed: Mar. 9, 2012

(65) Prior Publication Data

US 2012/0320304 A1    Dec. 20, 2012

(30) Foreign Application Priority Data

Jun. 17, 2011  (CN) .......................... 2011 1 0163351

(51) Int. Cl.
*G02F 1/1333* (2006.01)

(52) U.S. Cl.
USPC ............................................. 349/58; 362/632

(58) Field of Classification Search
USPC .............................. 349/58; 362/632, 633, 634
See application file for complete search history.

(56) References Cited

U.S. PATENT DOCUMENTS 8,319,910 B2 *   11/2012   Park ................................. 349/58

FOREIGN PATENT DOCUMENTS

TW           201118474 A1       6/2011

OTHER PUBLICATIONS

Taiwan Office Action for Taiwan Application No. 100121475 dated Feb. 19, 2014 with partial English translation.

* cited by examiner

*Primary Examiner* — Thoi Duong
(74) *Attorney, Agent, or Firm* — Muncy, Geissler, Olds & Lowe, P.C.

(57) ABSTRACT

A liquid crystal display device is disclosed. The liquid crystal display device includes a panel, a first frame, and a second frame. The panel has a side face. At least one first locking hole is disposed on the side face. The first frame includes a first side edge and a second side edge. The first side edge has at least one second locking hole and at least one slot. The at least one first locking hole and the at least one second locking hole are locked with each other via at least one locking element, so as to fix the panel and the first frame. The second frame has at least one hook part used for matching the at least one slot of the first side edge such that the second frame and the first frame can be fixed to each other.

5 Claims, 4 Drawing Sheets

LIQUID CRYSTAL DISPLAY DEVICE

BACKGROUND OF THE INVENTION

1. Field of the Invention

The present invention relates to a liquid crystal display device, specifically to a liquid crystal display device that reduces space by fastening from the side edge.

2. Description of the Related Art

In modern daily life, flat-screen liquid crystal display devices have become the major standard. Thus, the current design goals of modern liquid crystal display devices are to make them light, thin, short, and small, and to reduce production costs.

Please first refer to FIG. 1, which is a schematic drawing of an assembled liquid crystal display device of the prior art. In the prior art, a liquid crystal display device 90 is generally assembled first with a front frame 91 and a panel 92, followed by adding a back lid (not shown), in which the front frame 91 can be considered a side frame if seen from the front of the liquid crystal display device 90. A greater distance, for example, a space of 11-12 mm or so, between the outer frame of the panel 92 of the prior art and the surface of the side edge of the front frame 91 must be reserved for disposing a screw pillar 93 or a latch (not shown) on the front frame 91 so that the front frame 91 can be locked with the panel 92 or with a back lid by a screw 931. Therefore, a larger space is required for the front frame 91, which increases the production cost as well as the size of the liquid crystal display device 90. This design is also counter to the goal of producing a light, thin, short, and small device.

Therefore, it is desirable to provide a new liquid crystal display device to mitigate and/or obviate the aforementioned problems.

SUMMARY OF THE INVENTION

The primary objective of the present invention is to provide a liquid crystal display device whose space can be reduced by locking the components from the side edge during assembly.

In order to achieve the above-mentioned objective, the liquid crystal display device of the present invention comprises a panel, a first frame, and a second frame. The panel has a side face. The side face has at least one first locking hole. The first frame comprises a first side edge and a second side edge. The first side edge has at least one second locking hole and at least one slot. The side face of the panel is the first side edge next to the first frame, in which at least one first locking hole and at least one second locking hole are locked by at least one locking element, so as to fix the panel to the first frame. At least one hook part of the second frame is used for matching the at least one slot of the first side edge such that the second frame and the first frame are fixed to each other.

DETAILED DESCRIPTION OF THE PREFERRED EMBODIMENT

The advantages and innovative features of the invention will become more apparent from the following detailed description when taken in conjunction with the accompanying drawings.

Figure 1:
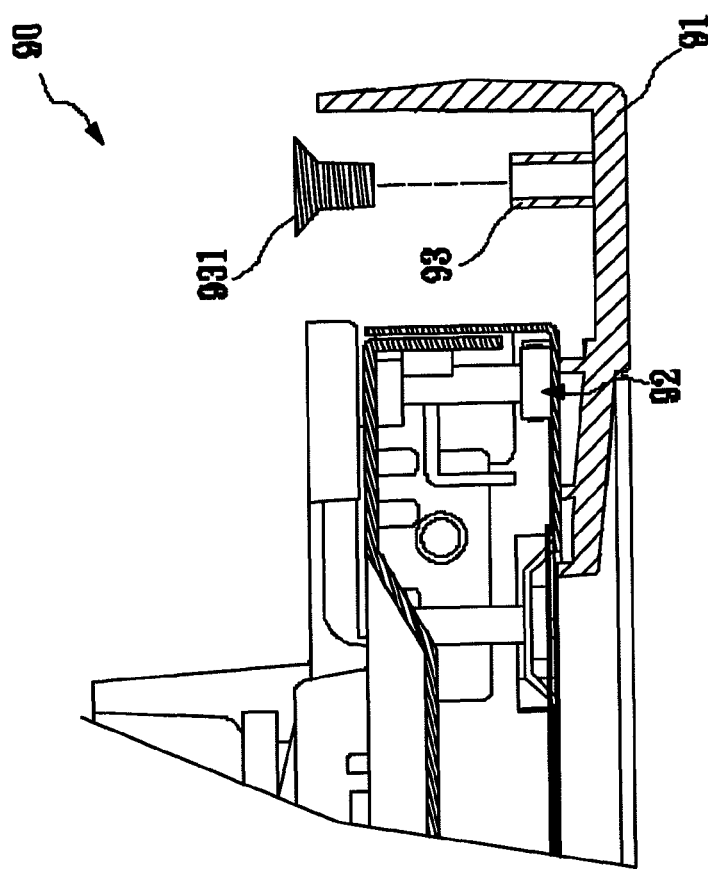
FIG. 1 is a schematic drawing of the assembly of a prior art liquid crystal display device.
Figure 2:
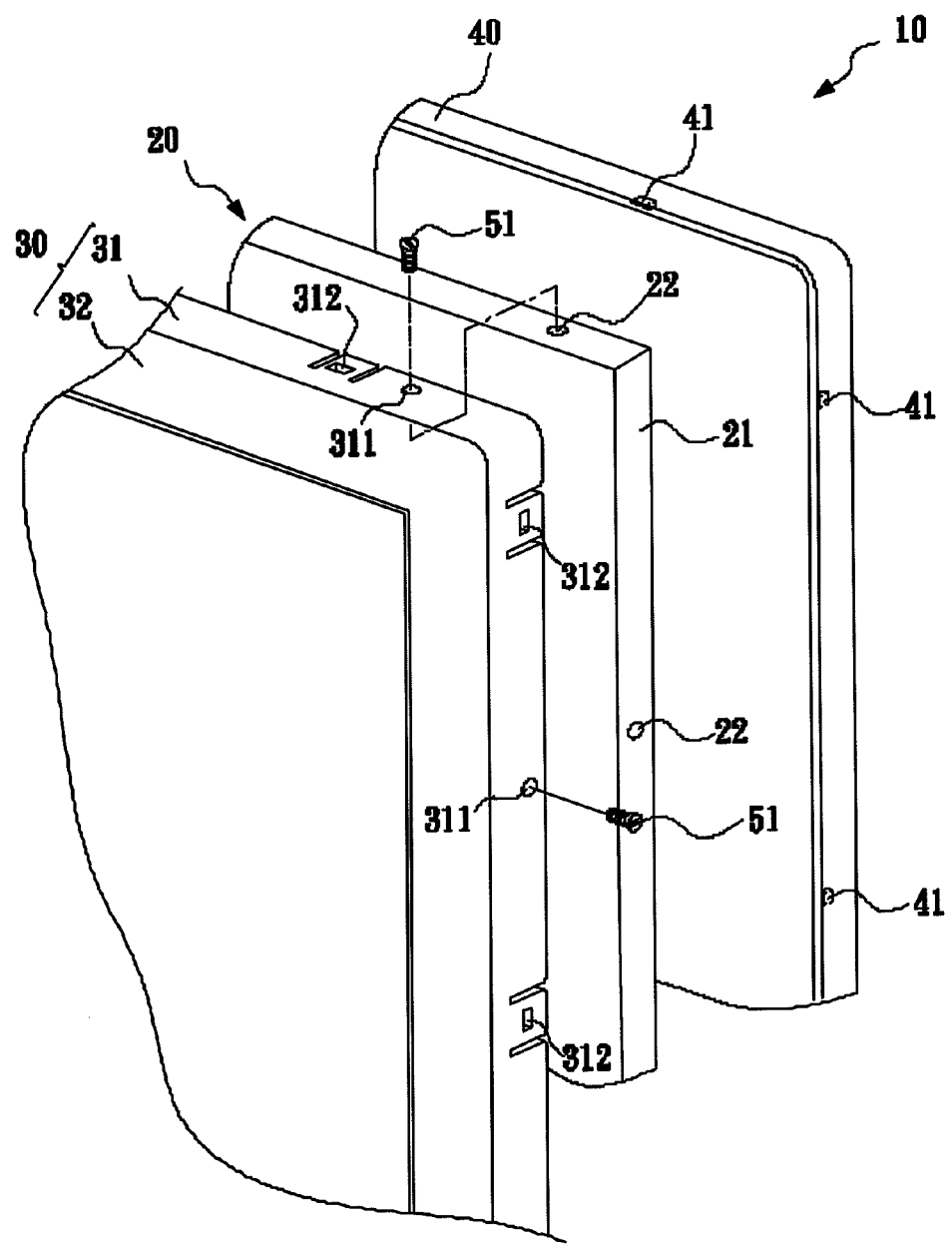
FIG. 2 is a schematic drawing of the assembled liquid crystal display device of the present invention.

Please refer to FIG. 2 first. FIG. 2 is a schematic drawing of the assembled liquid crystal display device of the present invention.

In one embodiment of the present invention, the liquid crystal display device 10 can be applied in, for example, television or computer monitors, although the present invention is not limited to such cases. The liquid crystal display device 10 comprises a panel 20, a first frame 30, and a second frame 40. The panel 20 may be composed of modules such as a reflector, a light guide plate, or a thin film layer, to display images. As the ways of displaying images via panel 20 have been widely applied in the technical fields attributable to the present invention and are not the point of the present invention, the methods will not be described here. The panel 20 has a side face 21, and the side face 21 has at least one first locking hole 22.

The first frame 30 comprises a first side edge 31 and a second side edge 32. The first side edge 31 and the second side edge 32 substantially form an L-shape, but the present invention is not limited to that shape. The first side edge 31 is adjacent to the side face 21 of the panel 20, and the first side edge 31 also has at least one second locking hole 311. The second locking hole 311 of the first side edge 31 and the first locking hole 22 are matching and lock with each other via a locking element 51, such that the first frame 30 and the panel 20 can be fastened together. In one embodiment of the present invention, the locking element 51 may be a screw, but the present invention is not limited to this. In order to firmly fasten the first frame 30 and panel 20, a plurality of first locking holes 22 and a plurality of second locking holes 311 can be used for matching and fixed to each other respectively via a plurality of the locking elements 51.

At least one slot 312 is disposed on the first side edge 31 of the first frame 30. In addition, at least one hook part 41 is disposed at the inside lateral of the second frame 40, where the inside lateral of the second frame 40 contacts the first side edge 31. The at least one hook part 41 and the at least one slot 312 of the first side edge 31 can be locked to each other such that the first frame 30 and the second frame 40 can be fastened together. Similarly, in order to more firmly fasten the first frame 30 and the second frame 40, the hooks 41 can be used for matching and fixed to each other respectively via the plurality of slots 312 of the first side edge 31.

Figure 3:
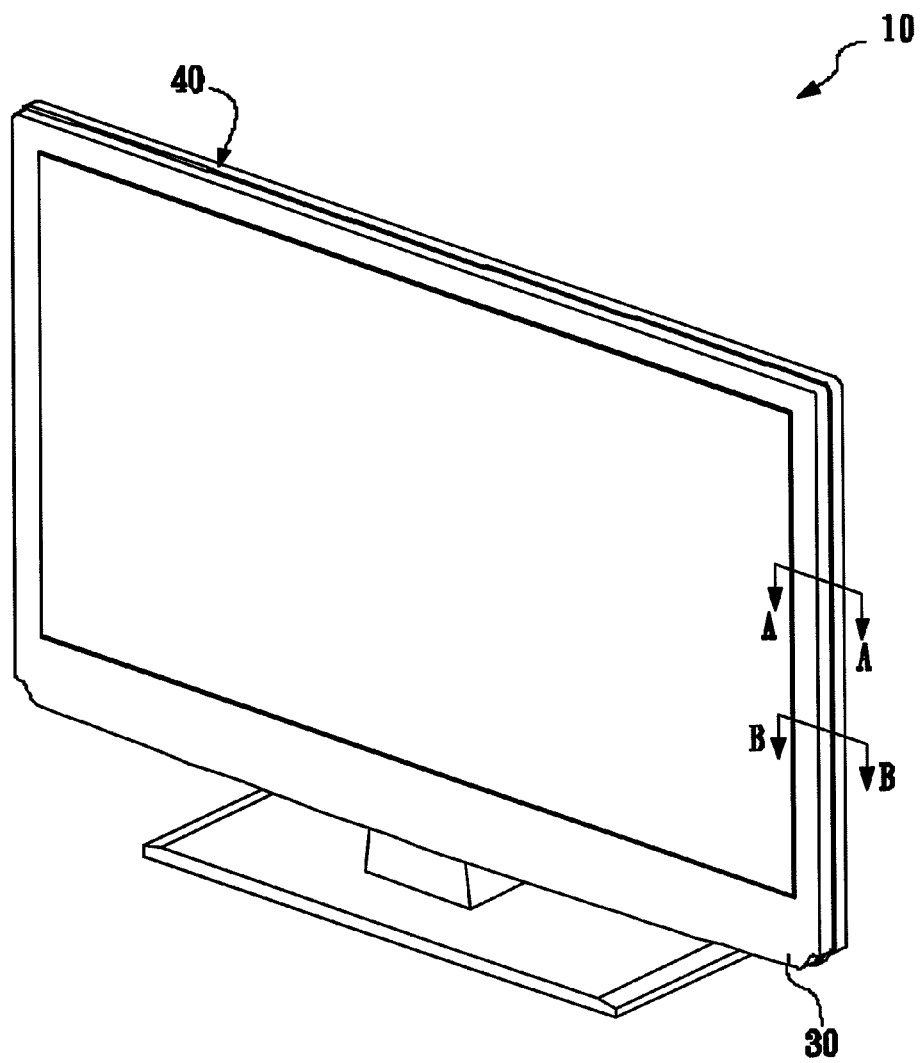
FIG. 3 is an outer schematic drawing of an assembled liquid crystal display device of the present invention.
Figure 3A:
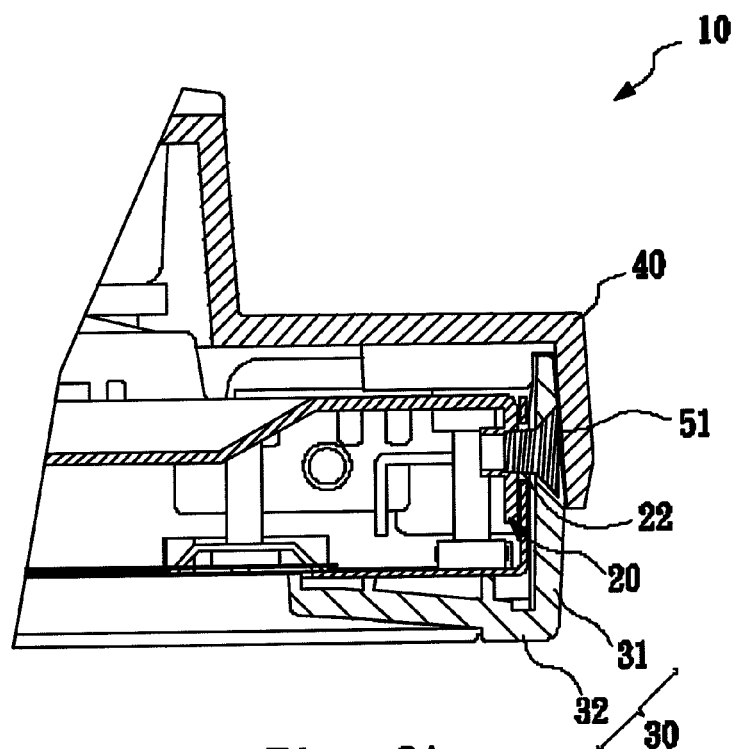
FIG. 3A is a cross-sectional drawing of one of the positions of the assembled liquid crystal display device of the present invention.
Figure 3B:
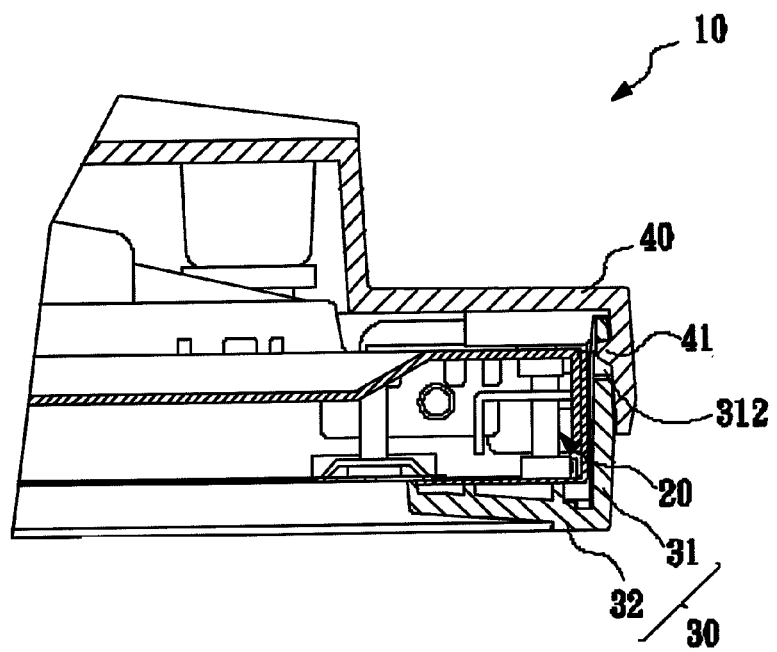
FIG. 3B is a cross-sectional drawing of another one of the positions of the assembled liquid crystal display device of the present invention.

Next, please refer to FIG. 3, FIG. 3A, and FIG. 3B together. The related schematic drawings are an assembled liquid crystal display device of the present invention. FIG. 3 is an outer schematic drawing of an assembled liquid crystal display device of the present invention. FIG. 3A is a cross-sectional drawing of one of the positions of the assembled liquid crystal display device of the present invention. FIG. 3B is a cross-sectional drawing of another one of the positions of the assembled liquid crystal display device of the present invention.

As shown in FIG. 3, FIG. 3A, and FIG. 3B, the second locking hole 311 of the first side edge 31 and the first locking hole 22 of the side face 21 on the panel 20 can be fastened with each other by the locking element 51. Also, the slot 312 of the first side edge 31 and the hook part 41 of the second frame 40 can be fixed to each other. Thus, for the first frame 30, the second locking hole 311 and slot 312 in different positions in the first side edge 31 can be fastened with the panel 20 and the second frame 40 respectively. In addition, as can be seen in FIG. 3A, after the first frame 30 and the second frame 40 are assembled, the locking position of the locking element 51 in the first frame 30 will be covered by the second frame 40. Therefore, no lock-up or latch-up elements can be seen on the exterior of the liquid crystal display device 10 after assembly, which further improves the aesthetic quality of the liquid crystal display device 10.

Because the elements for fastening the panel 20 and second frame 40 are located on the inside lateral, the first frame 30 does not require an additional screw pillar. The elimination of the additional screw pillar reduces the space of the liquid crystal display device 10. For example, in one embodiment of the present invention, the distance between the side face 21 of the panel 20 and the first side edge 31 of the first frame 30 can be reduced to 0.5 mm. Furthermore, the distance between the side face 21 of the panel 20 and the outside lateral first side edge 31 is only about 2.5 mm, even if the thickness of the first side edge 31, about 2 mm, is added. Therefore, after the panel 20 of the present invention is assembled with the first frame 30 and the second frame 40, the unnecessary space of the first frame 30 or the second frame 40 can be reduced significantly, which can solve the shortcomings in the prior art.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A liquid crystal display device comprising:
    a panel, comprising a side face, the side face having at least one first locking hole being disposed on the side face;
    a first frame, comprising a first side edge and a second side edge, the first side edge having at least one second locking hole and at least one slot, the side face of the panel being adjacent to the first side edge of the first frame; the at least one first locking hole and the at least one second locking hole are locked with each other via at least one locking element, so as to fix the panel and the first frame; and
    a second frame comprising at least one hook part which is used for matching the at least one slot of the first side edge such that the second frame and the first frame are fixed to each other;
    wherein when the second frame and the first frame are fixed to each other, the second frame covers at least one locking position of the locking element.

2. The liquid crystal display device as claimed in claim 1, wherein the locking element is a screw.

3. The liquid crystal display device as claimed in claim 1, wherein the first side edge and the second side edge substantially form an L-shape.

4. The liquid crystal display device as claimed in claim 1, wherein the side face comprises a plurality of first locking holes, the first side edge comprising a plurality of second locking holes, the plurality of first locking holes and the plurality of second locking holes respectively locking with each other via the plurality of locking elements.

5. The liquid crystal display device as claimed in claim 1, wherein the first side edge comprises a plurality of slots, the second frame comprises a plurality of hooks, and the plurality of hooks are respectively for matching the plurality of slots for locking with each other.

* * * * *